United States Patent
Attanasio et al.

(10) Patent No.: US 8,606,190 B2
(45) Date of Patent: Dec. 10, 2013

(54) USER AND TRAFFIC DATA RETENTION IN LAWFUL INTERCEPTION

(75) Inventors: Francesco Attanasio, Nocera Superiore (IT); Raffaele De Santis, Mercato San Severino (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 13/126,027

(22) PCT Filed: Oct. 28, 2008

(86) PCT No.: PCT/EP2008/064605
§ 371 (c)(1),
(2), (4) Date: Jun. 15, 2011

(87) PCT Pub. No.: WO2010/048989
PCT Pub. Date: May 6, 2010

(65) Prior Publication Data
US 2011/0244916 A1    Oct. 6, 2011

(51) Int. Cl.
*H04W 24/00*    (2009.01)
*H04W 52/02*    (2009.01)

(52) U.S. Cl.
USPC ......... 455/67.11; 455/420; 455/415; 455/411

(58) Field of Classification Search
USPC ......... 455/411, 410, 415, 420, 419, 436, 439, 455/442, 445, 459, 18, 515, 67.11
See application file for complete search history.

(56) References Cited

U.S. PATENT DOCUMENTS

2002/0159578 A1* 10/2002 Bern et al. .............. 379/219
2011/0122770 A1*  5/2011 Iovieno et al. .......... 370/235
2011/0202980 A1*  8/2011 Imbimbo et al. .......... 726/4

FOREIGN PATENT DOCUMENTS

WO    2007/097667 A1    8/2007
WO    2008/013482 A1    1/2008

OTHER PUBLICATIONS

European Telecommunications Standards Institute. ETSI TS 133 107, V7.7.0 (Oct. 2007). Universal Mobile Telecommunications System (UMTS); 3G security; Lawful interception architecture and functions (3GPP TS 33.107 version 7.7.0 Release 7). Oct. 2007.
European Telecommunications Standards Institute. ETSI TS 102 656, V1.1.2 (Dec. 2007). Lawful Interception (LI); Retained Data; Requirements of Law Enforcement Agencies for handling Retained Data. Dec. 2007.
3rd Generation Partnership Project. "Updates on TS 33.107 to Support LI for EPS." 3GPP TSG-SA3-LI Meeting #29, DocNo. SA2LI08_042, Vancouver, Canada, Apr. 22-24, 2008.

* cited by examiner

*Primary Examiner* — John J Lee
(74) *Attorney, Agent, or Firm* — Coats & Bennett, P.L.L.C.

(57) ABSTRACT

Lawful Interception (LI) management system for retrieving user and/or traffic data associated to a given target identity of a telecommunication network. The system comprises an Administration Function device and at least one Mediation/Delivery Function device. The LI management system comprises a first common handover interface to both a Data Retention Sources domain and an Intercepting Control Elements domain and a second common handover interface to at least one Law Enforcement Agency. The first common handover interface is configured to receive user and/or traffic data from both Data Retention Sources and Intercepting Control Elements.

17 Claims, 8 Drawing Sheets

USER AND TRAFFIC DATA RETENTION IN LAWFUL INTERCEPTION

TECHNICAL FIELD

The present invention relates to methods and arrangements in a telecommunications system comprising Data Retention (DR) and Lawful Interception systems for providing data to law enforcement agencies.

BACKGROUND

In many countries operators and Internet service providers are today obliged by legal requirements to provide stored traffic and user data generated from public telecommunications and Internet services for the purpose of detection, investigation and prosecution of crime and criminal offences, including terrorism.

Figure 1:
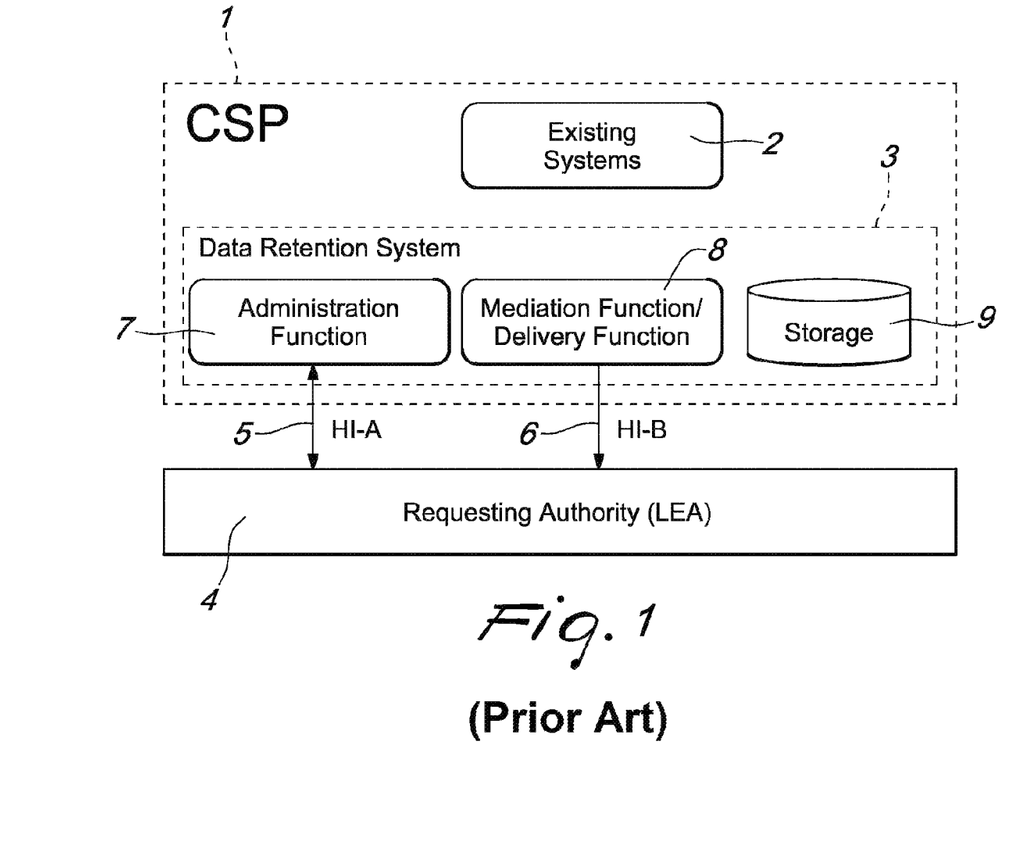
FIG. 1 is a known arrangement of a communication service provider with Data Retention (DR) capabilities.

FIG. 1 depicts the known arrangement for retaining data in a Communication Service Provider 1 (CSP). Specifically, the CSP 1, which may incorporate existing communication systems 2, is provided with a Data Retention System (DRS) 3 for exchanging retained data with a Requesting Authority 4, which may be a Law Enforcement Agency (LEA).

The data exchanged between the CSP 1 and the Requesting Authority 4 comprises requests from the Requesting Authority 4, corresponding responses from the DRS and other DR information, such as results of the requests and acknowledgements of receipt. The interfaces through which the CSP and DRS exchange the above data with the Requesting Authority are denoted as Handover Interfaces.

The generic Handover Interface adopts a two-port structure in which administrative request/response information and Retained Data Information are logically separated. In particular, a first Handover Interface port HI-A 5 is configured to transport various kinds of administrative, request and response information from/to the Requesting Authority 4 and an organization at the CSP 1 that is responsible for Retained Data matters, identified by an Administration Function 7.

A second Handover Interface HI-B 6 is configured to transport the retained data information stored in a repository 9 from the CSP 1 to the Requesting Authority 4. The individual retained data parameters have to be sent to the Requesting Authority 4 at least once (if available). To this aim, a Mediation/Delivery function 8 is provided, for retrieving the retained data from the memory means 9 and forward such data to the Requesting Authority 4 in a suitable format through the HI-B 6.

Figure 2:
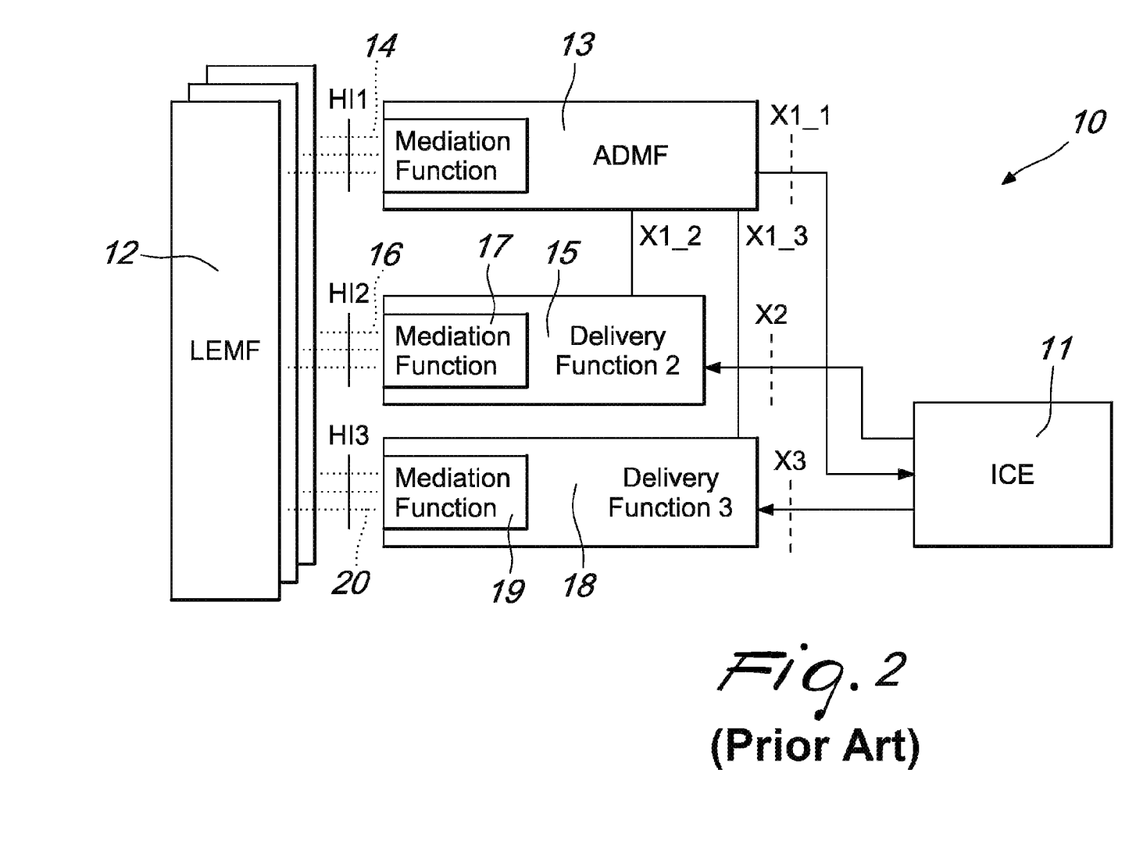
FIG. 2 is a known arrangement of a Lawful Interception system.

A second system for accessing communications related data is the well-known Lawful Interception (LI) system, which is depicted in FIG. 2. The standard architecture 10 comprises an Intercepting Control Element (ICE) 11 providing the user equipment of the target identity with an access to the telecommunications network. ICEs may be, for instance, a Mobile services Switching Center (MSC) Server, a Gateway MSC Server (GMSC), a Serving GPRS Support Node (SGSN), or a Gateway GSN (GGSN).

The architecture 10 further comprises one or more Law Enforcement Monitoring Facilities (LEMFs) 12 through which respective LEAs receive interception information.

An Administration Function (ADMF) entity 13 is further configured to send the target identity and LI authorization data from the LEAs to the ICE.

In order to deliver the intercepted information to the LEAs, two Delivery Functions (DF) entities are provided, each exchanging respective portions of information with the ADMF and the LEMF 12.

In particular, a DF2 entity 15 is configured to receive Intercept Related Information (IRI) from the ICE and to convert and distribute the IRI to the relevant LEAs via a second Handover Interface 16 (HI2) by means of a Mediation Function (MF) 17.

A DF3 entity 18, instead, is configured to receive Content of Communications (CC) information from the ICE 11 through an X3 interface, and to convert and distribute such information to the relevant LEA through an MF 19 and a third Handover Interface (HI3).

In the current LI standard solution, when intercepting a target identity it is not possible for the Authorities to have easy access to all relevant data, like historical user/traffic information related to the target under interception, with minimum effort for data protection as well as minimum involvement from the Operator personnel.

Another drawback of the prior art is that when the legal interception is activated for a specific target identity, it is not always possible to verify the effectiveness of the monitored target identity, during time span of the judge warrant ordering the monitoring: in other words, the target identity could be no longer associated to the investigated person or no longer a valid traffic identity.

Yet another drawback from the network operator point of view is that correct interception on the basis of the target identities ordered by LEA is not guaranteed. By "correct" it is intended the capability to provide interception triggers in the network whichever service is applicable for the ordered target identity. The network operator has a network topology on which it spreads the court order for interception and it is not always possible to verify the correctness of such topology against the real network scenario of the target subscriber.

As example, in the next generation networks, a target identity can be used to generate traffic for many and different services. With particular regard to new multimedia services, not all traffic nodes has an ICE function immediately available, due to complexity in implementing new interception service logics and because of the multi-vendor scenario.

Therefore, when the LEA is requesting to intercept the traffic done by a given target identity, the network operator currently cannot detect all the applicable network services for such identity and detect the network nodes where to set up the interception triggers. This scenario may lead to bad interception that could be documented by LEA only by means of parallel investigation activities done via other tools, like analysis of retained data.

SUMMARY

The aim of the present invention is to provide a method and a node that overcome the above drawbacks.

This aim and other objects which will become better apparent hereinafter are achieved by a Lawful Interception (LI) management system for retrieving user and/or traffic data associated to a given target identity of a telecommunication network. The system comprises an Administration Function device and at least one Mediation/Delivery Function device. According to a preferred aspect of the invention, the LI management system comprises a first common handover interface to both Data Retention Sources domain and Intercepting Control Elements domain and a second common handover interface to at least one Law Enforcement Agency. The first common handover interface is configured to receive user and/or traffic data from both Data Retention Sources and Intercepting Control Elements.

Preferably, the first common handover interface comprises a first handover interface and a second handover interface.

The Administrative Function device may be connected to the first handover interface and configured to send a request for user/traffic retained data relating to the target identity to the Data Retention Sources domain via the first handover interface. The Mediation/Delivery Function device may be connected to the second handover interface and configured to receive the user/traffic retained data in response to the request.

The second common handover interface may comprise a third handover interface and a fourth handover interface. In this case, the Administrative Function device is preferably connected to the third handover interface and is configured to receive a lawful interception request from the at least one Law Enforcement Agency via the third handover interface. The lawful interception request may comprise a start of interception time of the target identity. The Mediation/Delivery Function device may be connected to the fourth handover interface and configured to send the user/traffic retained data as Intercept Related Information to the at least one Law Enforcement Agency via the fourth handover interface.

According to a first preferred embodiment of the invention, the user/traffic retained data is historical user/traffic retained data available at the Data Retention Sources in a configurable time span before the start of interception time.

According to a second embodiment of the invention, the Administrative Function device is configured to send polling requests via the first handover interface to the Data Retention Sources domain for retrieving updated user/traffic retained data relating to the target identity. In this case, the Mediation/Delivery function device may be configured to compare the updated user/traffic retained data received via the second handover interface with previously received user/traffic retained data and to send the updated user/traffic retained data as Intercept Related Information to the at least one Law Enforcement Agency via the fourth handover interface if changes between the updated user/traffic retained data and the previous user/traffic retained data meet predetermined requirements.

In the second embodiment, the lawful interception request may comprise a command to stop interception if such predetermined requirements are not met.

According to a third embodiment of the invention, the LI management system is configured to: retrieve a list of traffic nodes which are applicable to the target identity; determine differences between the topology of the Intercept Control Elements domain and the Data Retention Sources domain for finding out non-intercepting traffic nodes; send a request for traffic data associated to the target identity for the non-intercepting traffic nodes via the first handover interface; and receive the traffic data for the non-intercepting traffic nodes via the second handover interface.

The above drawbacks are also solved by a telecommunications network comprising a Data Retention Sources domain and an Intercepting Control Elements domain, and comprising the above Lawful Interception management system for retrieving user and/or traffic data associated to a given target identity of the telecommunication network.

Moreover, the above drawbacks are solved by a method for retrieving user and/or traffic data associated to a given target identity of a telecommunication network. According to the method, a Lawful interception management system is provided for interfacing Law Enforcement Agencies to a Data Retention Sources domain and a Intercepting Control Elements domain of the telecommunications network. At the Lawful interception management system, a lawful interception request for user and/or traffic data associated to a given target identity of the telecommunication network is received from at least one of the Law Enforcement Agencies. At the Lawful interception management system, the user and/or traffic data is retrieved from at least one of the Data Retention Sources domain and the Intercepting Control Elements domain, using a first common handover interface which is common to both of the domains.

The user/traffic retained data may be historical user/traffic retained data available at the Data Retention Sources in a configurable time span before the start of interception time.

The user/traffic retained data may also be new data, and in this case, at the LI management system, polling requests are sent to the Data Retention Sources domain, updated user/traffic retained data relating to the target identity is retrieved and compared with previously received user/traffic retained data. Then, the updated user/traffic retained data is sent as Intercept Related Information to the at least one Law Enforcement Agency if changes between the updated user/traffic retained data and the previous user/traffic retained data meet predetermined requirements.

Interception may be stopped if the predetermined requirements are not met.

Optionally, at the Lawful interception management system a list of traffic nodes which are applicable to the target identity may be retrieved. Then, differences between the topology of the Intercept Control Elements domain and the Data Retention Sources domain may be determined for finding out non-intercepting traffic nodes. A request may be sent for traffic data associated to the target identity to the non-intercepting traffic nodes and the traffic data for the non-intercepting traffic nodes may be received in response.

An important advantage of the invention is that LEAs can use one common secure administrative interface; this makes the retrieval of all information LEAs need easier and more secure than handling separate requests on different systems, i.e. LI Management and DR systems, that would require interconnections to multiple administrative domains and applications. Such a common secure access also preserves the confidentiality of investigation and improves protection to the accessed data.

Proper user/traffic information notifications are useful to verify during the interception about the effectiveness of the monitored target identity. For instance, the traffic logs may report that the monitored target entity is no longer used for generating traffic for the considered service, in a configurable time span after the start of interception.

Moreover, since not all traffic nodes have an ICE function immediately available, due to complexity in implementing new interception service logic, the Data Retention System peculiarity can be used to get traffic data information by existing interfaces, such as charging or O&M interfaces.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 3:
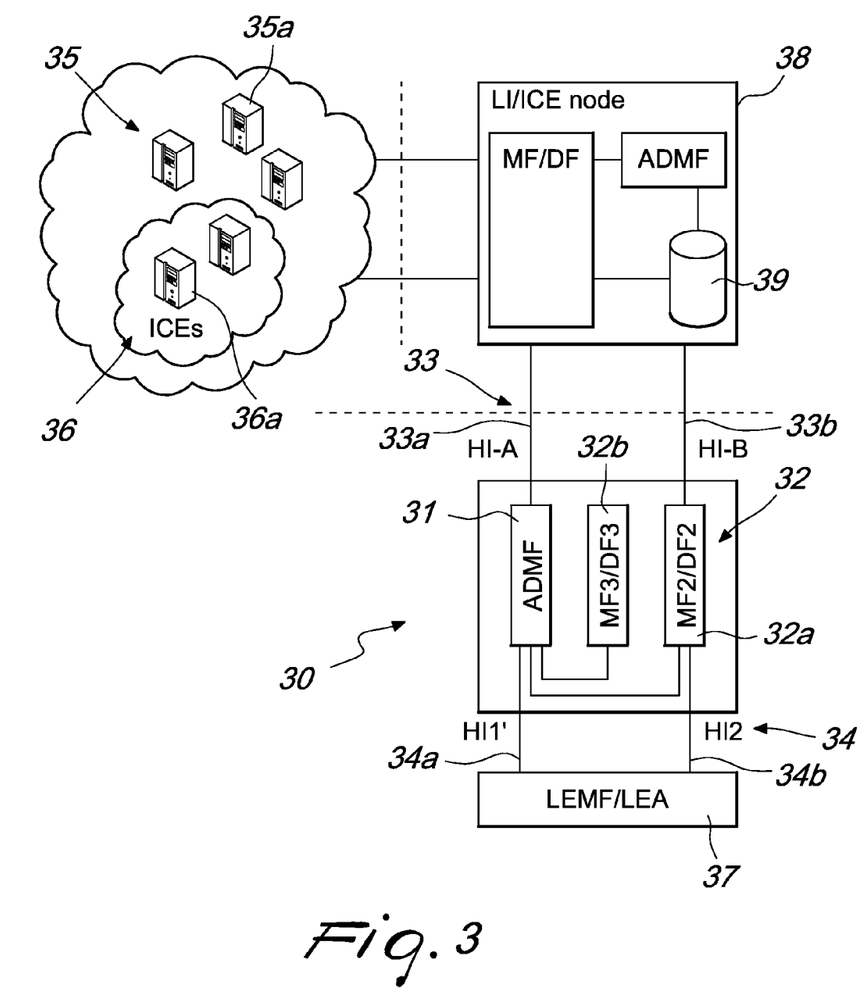
FIG. 3 is an arrangement of an LI management system according to the invention.

With reference to FIG. 3, a Lawful Interception management system according to the invention, generally indicated with 30, comprises an Administration Function 31 and a Mediation/Delivery Function 32, which may be implemented in physically separated computing devices or implemented in a single computer having a plurality of communication ports for separately interfacing with the other components of the network.

The Mediation/Delivery function 32 preferably comprises an MF2/DF2 function 32*a* which can receive retained user data or traffic data. Optionally, a separate MF3/DF3 function 32*b* may be provided in the Mediation/Delivery function 32, for receiving content of communications of a target user.

User data may includes names, addresses, birth dates, service identification (phone numbers, e-mail addresses, permanent IP addresses, logon names, conference call identifier, etc.), credit cards numbers, passport number, type of subscriptions, applicable network services, ex-number, service identifier associated with a specific service or tele service (for example a MSISDN can be associated with a service like GSM and/or UMTS and within GSM it can also associate to the tele service voice, fax or data).

Traffic data may include telephony, messaging and network access records.

The LI management system 30 further comprises a first common handover interface 33 to both a Data Retention Sources domain 35 and an Intercepting Control Elements domain 36, and a second common handover interface 34 to at least one Law Enforcement Agency 37.

The first common handover interface 33 comprises a first handover interface HI-A 33*a* and a second handover interface 33*b*. The Administrative Function 31 is connected to the first handover interface HI-A 33*a* and is configured to send requests for user/traffic retained data relating to a target identity to the Data Retention Sources domain 35 via the first handover interface 33*a*. The Mediation/Delivery Function is instead connected to the second handover interface HI-B 33*b* and is configured to receive the user/traffic retained data in response to corresponding requests by the ADMF 31.

The second common handover interface 34 comprises a third handover interface HI1' 34*a* and a fourth handover interface HI2 34*b*: the former is connected to the Administrative Function 31, which is configured to receive lawful interception requests from the Law Enforcement Agencies 37 via such third handover interface 34*a*.

The MF2/DF2 Function 32*a* device is instead connected to the fourth handover interface 34*b* and is configured to send the user/traffic retained data as Intercept Related Information to the Law Enforcement Agencies 37 via the fourth handover interface 34*b*.

User and traffic data may be collected and stored via an intermediate node 38 configured to operate as both an LI supporting node and an ICE. Such intermediate node 38 may be a Data Retention System such as that depicted in FIG. 1 and which is connected to the DR domain 35 and to the ICE domain 36 of the telecommunication network via two handover interfaces for separately carrying requests and data responsive to the requests. The node 38 may comprise an Administration Function ADMF used to handle and forward requests from/to the requesting authority, which in this case is represented by the LI management system 30. A Mediation and Delivery function MF/DF is used to mediate and deliver requested information. The intermediate node 38 also comprises a storage 39, which can be used for collecting user/traffic data received from the nodes of the DR and ICE domains and providing such data upon request from the LI management system 30.

In accordance with a first embodiment of the invention, which will be discussed with reference to FIGS. 4 and 5, the DF2 function 32*a* of the LI management system is configured to provide historical user and traffic information to the legal agencies 37, when a corresponding request is received over the third handover interface 34*a*.

In this case, the intermediate node 38 is used as an LI supporting node for the retrieval of historical user and/or traffic data related to the target in a configurable time span before the start of interception.

Figure 4:
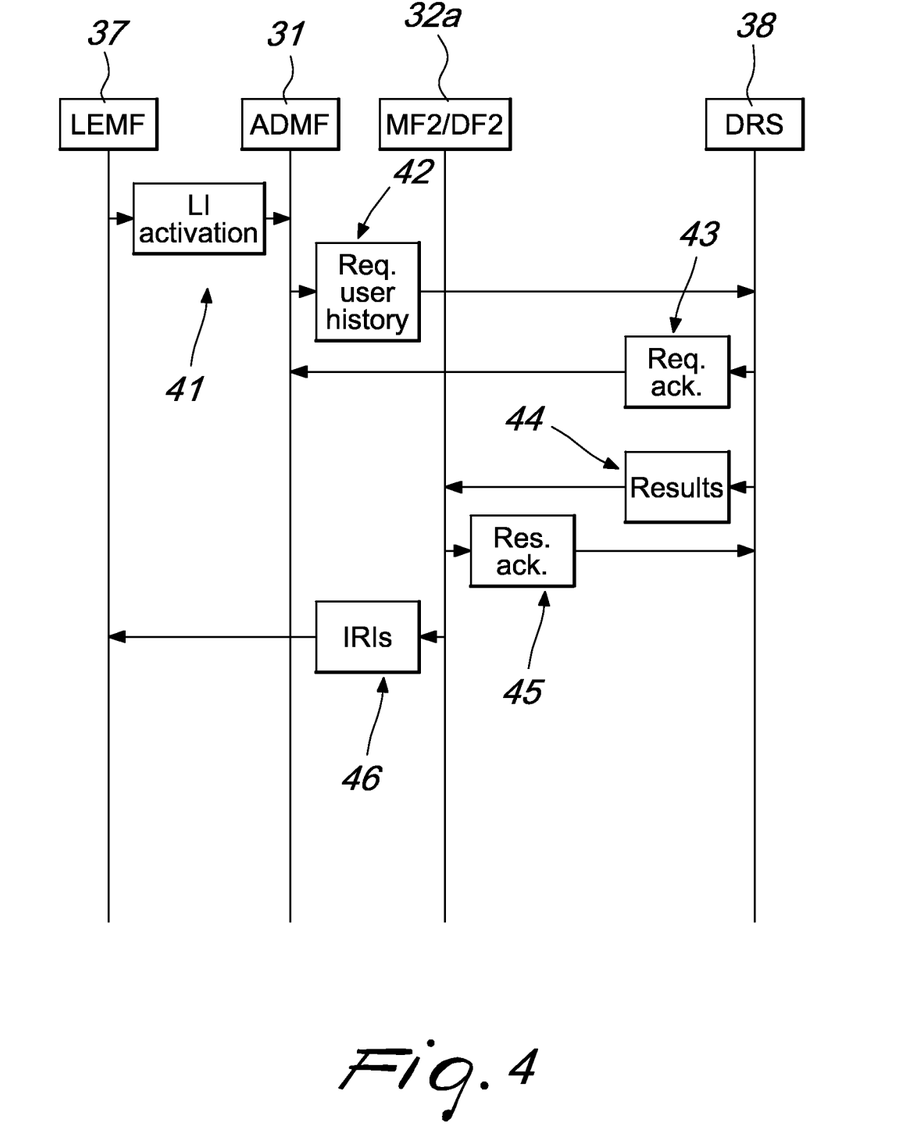
FIG. 4 shows the operation of the LI management system of FIG. 3 according to a preferred embodiment of the invention for retrieving historical user data.

With regard to FIG. 4, the first embodiment of the invention is used to set interception with automatic retrieval of all user data category of the target identity.

In step 41, a lawful interception request is sent by the mediation function (LEMF) of the LEA 37 to the ADMF 31 via the third handover interface 34*a*. The request comprises a start of interception time of the target identity, which may be set by the LEA 37 based on a court order.

When the Lawful Interception Identifier (LIID) is missing in the request, the request may be intended as a pure Data Retention query.

The request contains an order to provide historical user retained data related to the target user.

Historical user/traffic information is useful to verify, at the start of interception, the effectiveness of the monitored target identity. As an example, the historical traffic logs could report that the target has not been generating traffic since a considerable amount of time before the start of interception time.

In step 42, the ADMF 31 sends a request message for user retained data related to the target identity over the first handover interface 33*a*.

Without undue delay, the intermediate node 38 acknowledges that the request was correctly received from the LI Management System (step 43).

Then, in step 44, the intermediate node 38 assembles the available stored user data which has been generated in the DR domain 35 up to the start of interception time and sends such data to the MF2/DF2 function 32*a* over the second handover interface 33*b*. It is to be noted that the start of interception time may be present in the request message from the ADMF 31, but may alternatively be the instant when such request message is received at the intermediate node 38: in the latter case, the historical user data is the data available at the intermediate node 38 when the request message is received from the ADMF 31.

Without undue delay, the MF2/DF2 function 32*a* acknowledges it has received the response from the intermediate node 38 (step 45).

Finally, in step 46 the MF2/DF2 function sends the historical user data to the LEMF as one or more IRI messages over the fourth handover interface 34*b*.

Figure 5:
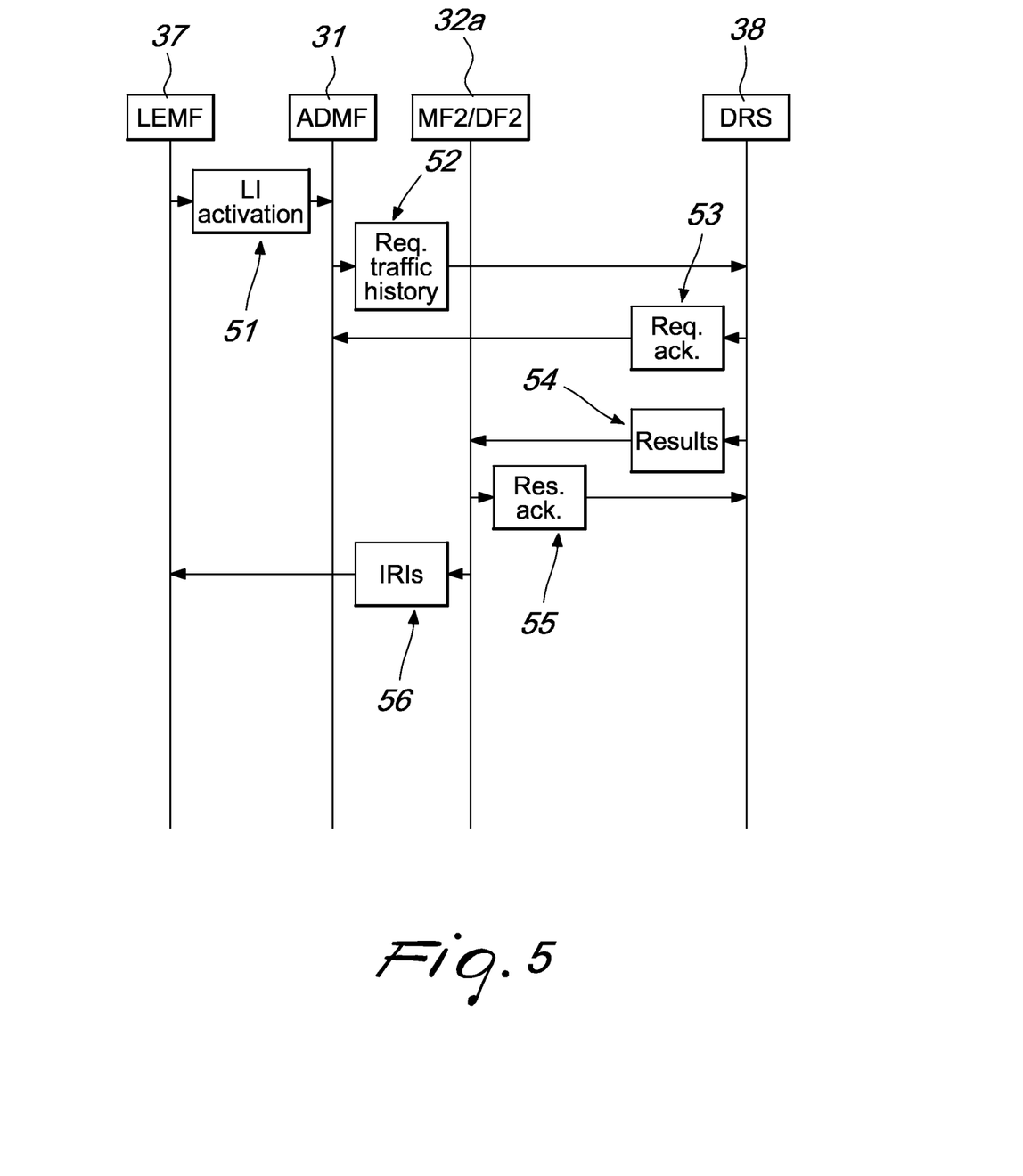
FIG. 5 shows the operation of the LI management system of FIG. 3 according to a preferred embodiment of the invention for retrieving historical traffic data.

FIG. 5 shows the first embodiment of the invention when historical traffic data of a target user, such as a multi-service user, is requested by the LEA 37.

Similarly to the case of FIG. 4, a request for historical traffic data is sent by the LEMF to the ADMF 31 via the third interface 34a (step 51) and a corresponding request message is generated by the ADMF 31 and sent to the intermediate node 38 (step 52) via the first handover interface 33a.

Further to the issuance of an appropriate acknowledgement message (step 53) the intermediate node 38 assembles the historical traffic data and delivers the same over the second handover interface 33b via a Res message to the MF2/DF2 function 32a (step 54).

Finally, the MF2/DF2 32a acknowledges receipt of the Res message from the intermediate node 38 (step 55) and sends the historical traffic data to the LEMF in one or more IRI messages via the fourth handover interface 34h (step 56).

Figure 6:
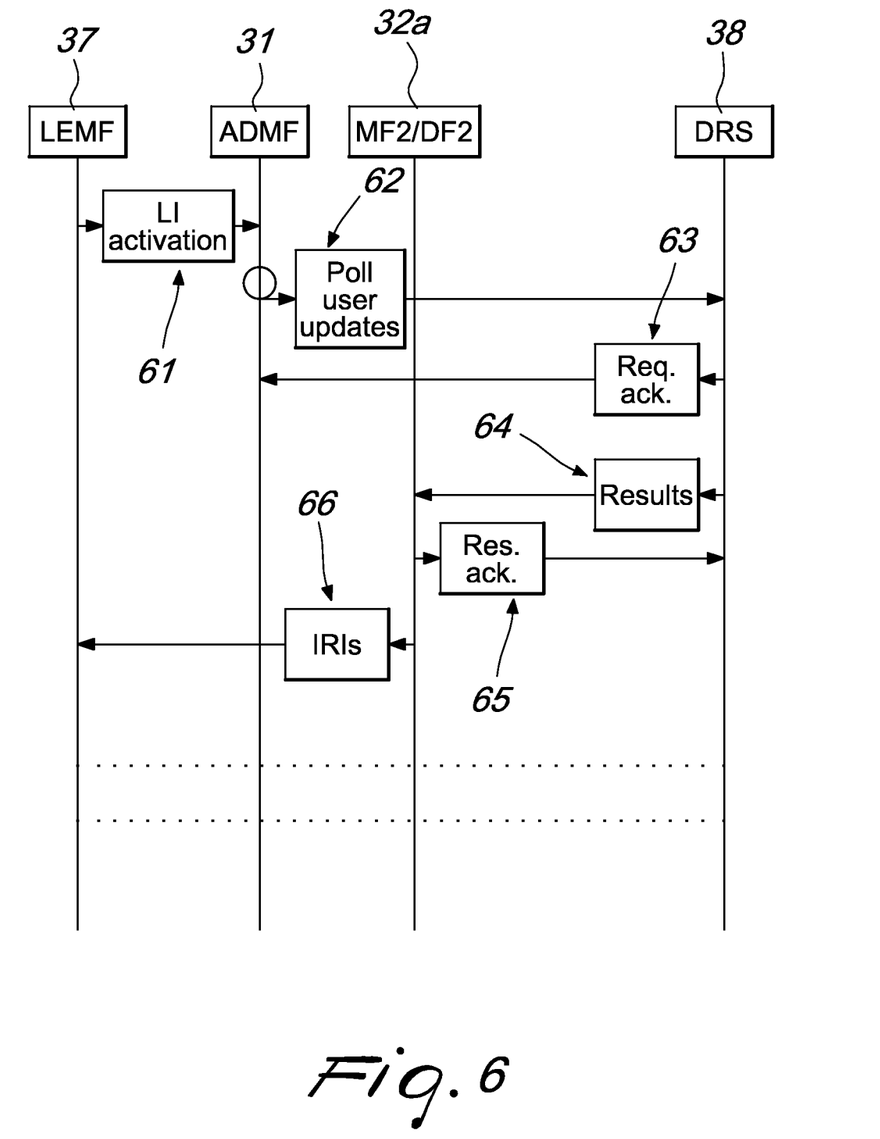
FIG. 6 shows the operation of the LI management system of FIG. 3 according to a preferred embodiment of the invention for retrieving new/updated user data.

In a second embodiment of the invention, which will be discussed with reference to FIGS. 6 and 7, the user/traffic data is spontaneously provided via the LI Management System 30 when some events occur. These events may include the target identity be no longer a valid traffic identity or no more effective for being monitored because the historical traffic logs report that the identity is no longer used for generating traffic, for a specific service, in a configurable time span after the start of interception.

In this case, the intermediate node 38 is accessed by the LI Management System 30 as an ICE node for retrieving all new user data category notifications related to the target in the time span defined in the warrant or court order triggering the interception. The warrant or court order will also contain the order to activate an LI request about new user data.

Based on the contents of the warrant or court order, in step 61 the LEMF of the LEA 37 sends a lawful interception request to the ADMF 31 via the third handover interface 34a. The request is aimed at notifying the LEA 37 any future new user data.

Optionally, based on the content of the request from the LEMF, the LI management system 30 may stop the interception if the started legal interception is no longer reliable, because of a change in the relationship existing between the target and user data (e.g. an IMSI is not valid anymore for a specified subscriber).

In step 62, the ADMF 31 sends the intermediate node 38 a polling request (Req message) for new user data notifications related to the target identity. The polling request is sent over the first handover interface 33a. The polling request is periodically generated and sent by the ADMF 31, in order to be updated about changes in the user data.

The intermediate node 38, after having acknowledged receipt of the Req message (step 63), fetches user data, e.g. by interfacing with other systems such as Customer Relations Management (CRM), assembles the updated user data and delivers them over the second handover interface 33h as a Res message to the MF2/DF2 function 32a (step 64). The updated user data will be data the intermediate node 38 has not already sent to the MF2/DF2 in the current interception triggered by step 61. The intermediate node 38, in fact, is configured to log communications with the LI management system 30 and is accordingly aware of which data have been already sent to the LI management system 30.

The MF2/DF2 32a is configured to compare the user data received from the intermediate node 38 with previous user data, for determining that the changes comply with certain criteria previously set in the lawful interception request received from the LEMF in step 61. If the changes match the criteria, the LI management system 30 concludes that new user data is available and, accordingly, in step 66 the MF2/DF2 32a sends such new user data in one or more IRI messages to the LEMF via the fourth handover interface 34b.

Finally, the procedure jumps back to step 62, i.e. the MF2/DF2 32a will continue to poll in background the intermediate node 38. The polling will continue for the time span defined in the lawful interception request from the LEA 37, i.e. in the warrant or court order.

Figure 7:
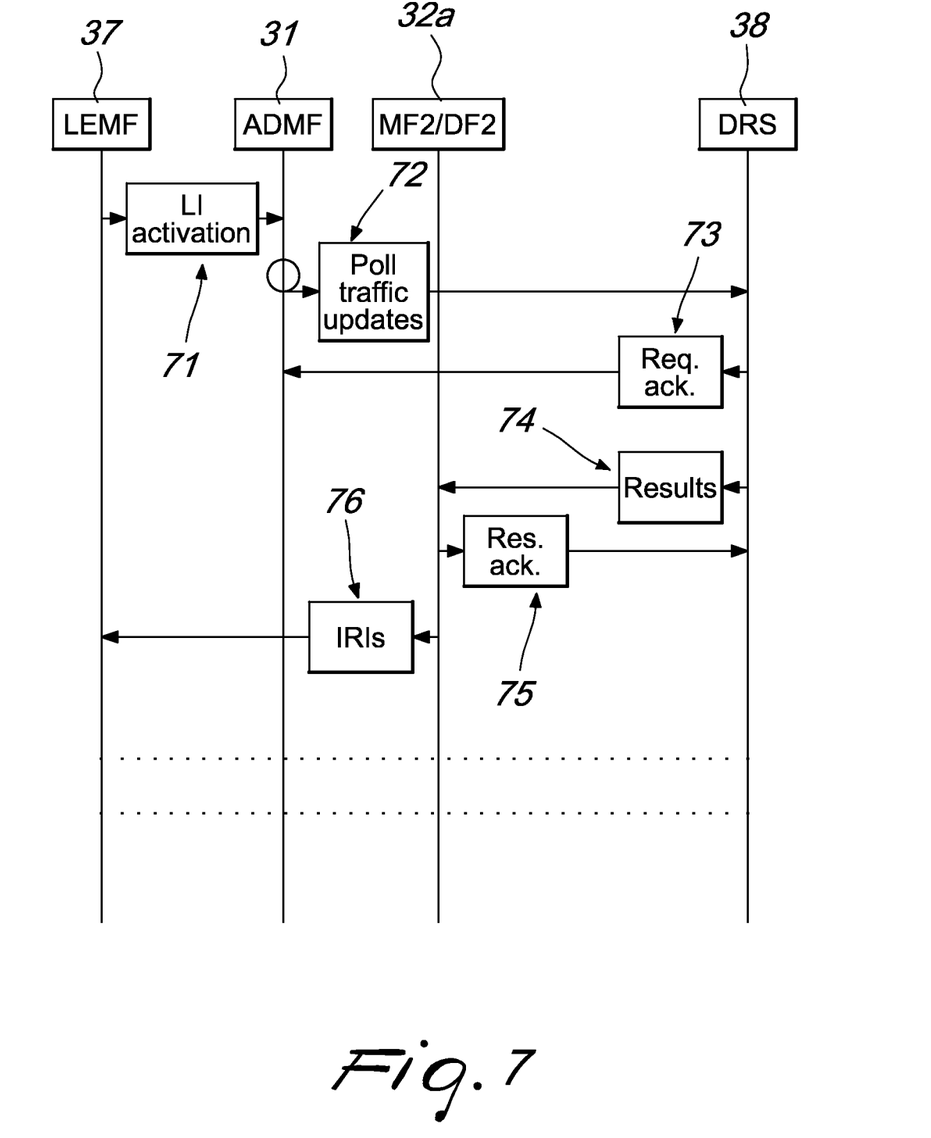
FIG. 7 shows the operation of the LI management system of FIG. 3 according to a preferred embodiment of the invention for retrieving new/updated traffic data.

FIG. 7 shows the procedure according to which the second embodiment of the invention operates when all new traffic data notifications linked to the target identity in the warrant time span are requested in the warrant or court order.

The procedure substantially follows the same steps already discussed with reference to FIG. 6, the only difference being that new/updated traffic data is the requested information, instead of new/updated user data.

More particularly, the procedure is triggered in step 71 by the LEMF sending a lawful interception request to the ADMF 31, the request comprising target information and the order to notify new or updated traffic data related to the target user, for a certain time span. The request may also contain criteria defining when traffic data shall be deemed new or updated. This criteria will essentially depend on which traffic information the LEA or the court ordering the interception is interested in.

In step 72, the intermediate node 38, acting as an ICE node, receives from the ADMF 31a polling request for new traffic data notifications related to other user identities linked to the target user. The intermediate node 38, which logs prior traffic data communications with the LI management system 30, interfaces with the Data Retention Sources 35a for fetching traffic data.

After having acknowledged receipt of the Req message (step 73), the intermediate node 38 assembles the updated traffic data, if available, and delivers them over the second handover interface 33b as a Res message to the MF2/DF2 function 32a (step 74).

The MF2/DF2 32a is configured to compare the traffic data received from the intermediate node 38 with previous traffic data available at the LI management system 30, in order to determine that the changes in traffic data comply with the criteria previously set in the lawful interception request received from the LEMF in step 71. In step 76, the MF2/DF2 32a sends such new or updated traffic data, assembled in one or more IRI messages, to the LEMF via the fourth handover interface 34b.

Then, the procedure goes back to step 72 and is repeated until the time span ordered in the lawful interception request of step 71 expires.

In a third embodiment of the invention, which will be discussed with reference to FIG. 8, the LI Management System 30 is used to help the network operator in providing the Agency with effective interception, in case it was not possible to intercept the target identity because the ICE function is not supported in some nodes of the network or some specific services are new and cannot be intercepted. It will provide the operator a way to notify the Agency about the new information (fetched from the intermediate node 38) to be considered in alternative to the data not available from the interception domain, possibly provided via the same LI Delivery Function 2 interface 33b when the data are available.

In this case, the MF2/DF2 32a is configured to notify the LEA 37 in real time about new information that could be provided when the traffic data will become available from the Data Retention System domain 35.

Figure 8:
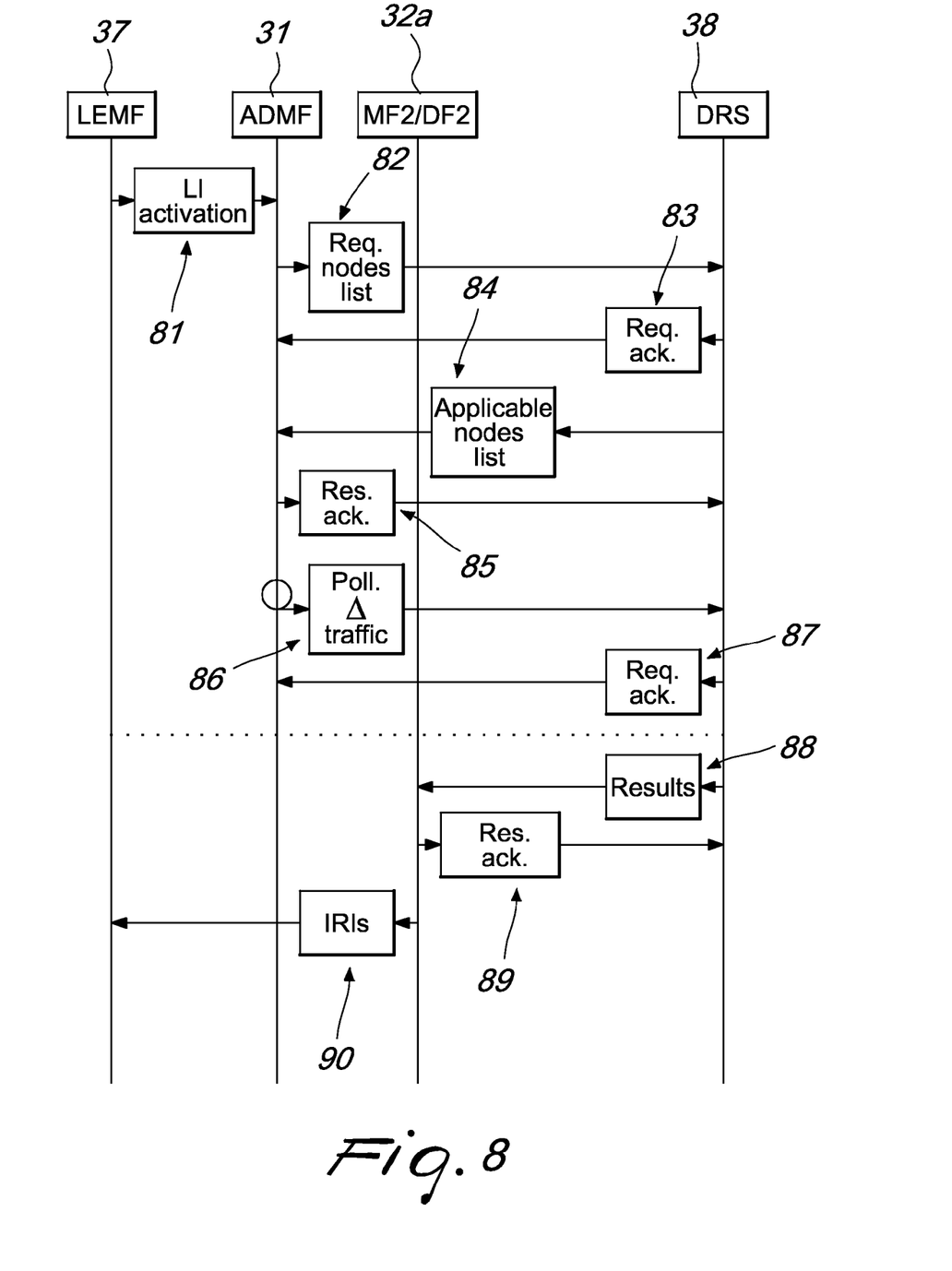
FIG. 8 shows the operation of the LI management system of FIG. 3 according to a preferred embodiment of the invention for retrieving data from non-ICE nodes.

More particularly, with reference to the embodiment of FIG. 8, the intermediate node 38 is configured to act as an ICE node for the retrieval of all traffic data notifications related to the target in the time span contained in the interception warrant or order issued by a court which could not be retrieved by nodes that do not have an ICE function, e.g. for some specific new services.

The target interception is activated on warrant basis by the delivery of a lawful interception request from the LEMF of a LEA 37 to the ADMF 31 of the LI management system, via the third handover interface 34*a*. The request contains at least the order to report all the traffic data, generated by the target identity, optionally limited to a certain time span (step 81).

In step 82, the ADMF 31 requests the intermediate node 38 a list of the traffic nodes of both the DR domain 35 and the ICE domain 36 that are applicable to the target identity identified in the lawful interception request. Such sort of auditing function of network topologies is performed by means of the first handover interface 33*a*.

After having sent a request acknowledgement in step 83, the intermediate node 38 sends the list to the ADMF 31 of the LI management system 30 in step 84.

The ADMF 31, after appropriate acknowledgement of receipt (step 85), determines the differences between the topology of the ICE domain 36 with the DR domain 35 to find-out the non-intercepting nodes.

Then, the ADMF 31 triggers a polling step 86, by starting to send a polling request to the intermediate node 38 via the first handover interface 33*a* for all traffic data related to the target identity for all of the non-intercepting nodes.

In step 87, the intermediate node 38 acknowledges receipt of the polling request and every time it determines to have a complete response, it assembles the "delta" traffic data and delivers the same over the second handover interface 33*b* as a Res message to the MF2/DF2 32*a* (step 88). Delta traffic data is considered the traffic data that cannot be provided by nodes where ICE function is not implemented, so IRIs from the intermediate node 38 will replace the missed LI IRIs from the non-intercepting nodes.

Without undue delay, the MF2/DF2 32*a* acknowledges it has received a Res message from the intermediate node (step 89) and finally delivers the delta traffic data as one or more IRI messages over the fourth handover interface 34*b* to the LEMF of the requesting LEA 37 as replacement of the missing LI data from the intercept domain 36 (step 90).

The ADMF 31 will continue in background to poll the intermediate node 38 for new data, as in the previous Polling step.

It has been shown that the invention fully achieves the intended aim and objects, since allows the LEAs to use one common secure administrative interface which makes the retrieval of all information LEAs need easier and more secure than handling separate requests on different systems, i.e. LI Management and DR systems. Such a common secure access also preserves the confidentiality of investigation and improves protection to the accessed data.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A Lawful Interception management system for retrieving at least one of user data and traffic data associated with a given target identity within a telecommunication network, the system comprising:
   a first common handover interface to both a Data Retention Sources domain and an Intercepting Control Elements domain, said first common handover interface being configured to receive at least one of user data and traffic data from both Data Retention Sources and Intercepting Control Elements;
   a second common handover interface to at least one Law Enforcement Agency;
   an Administrative Function device configured to send polling requests via said first common handover interface to said Data Retention Sources domain for retrieving at least one of updated user data or updated traffic data relating to and retained for said target identity;
   at least one Mediation/Delivery function device configured to compare said updated user data or traffic data received via the first common handover interface with previously received user data or traffic data, respectively, and to send said updated user data or traffic data as Intercept Related Information to said at least one Law Enforcement Agency via said second common handover interface if changes between said updated data and said previously received data meet predetermined requirements.

2. The system of claim 1, wherein said first common handover interface comprises a first handover interface and a second handover interface, wherein said Administrative Function device is connected to said first handover interface and is configured to send a request for at least one of updated user data or updated traffic data relating to and retained for said target identity to said Data Retention Sources domain via said first handover interface, and wherein said Mediation/Delivery Function device is connected to said second handover interface and is configured to receive said updated data in response to said request.

3. The system of claim 2, wherein said second common handover interface comprises a third handover interface and a fourth handover interface, wherein said Administrative Function device is connected to said third handover interface and is further configured to receive a lawful interception request from said at least one Law Enforcement Agency via said third handover interface, said lawful interception request comprising a start of interception time of said target identity, and wherein said Mediation/Delivery Function device is connected to said fourth handover interface and is configured to send said updated data as Intercept Related Information to said at least one Law Enforcement Agency via said fourth handover interface.

4. The system of claim 3, wherein said user data or traffic data is historical user data or traffic data available at the Data Retention Sources in a configurable time span before said start of interception time.

5. The system of claim 3, wherein the lawful interception request comprises a command to stop interception if said predetermined requirements are not met.

6. The system of claim 1, configured to:
   retrieve a list of traffic nodes which are applicable to the target identity;
   determine differences between the topology of the Intercept Control Elements domain and the Data Retention Sources domain for finding out non-intercepting traffic nodes;

send, via said first common handover interface, a request for traffic data associated with said target identity for said non-intercepting traffic nodes; and receive, via said first common handover interface, said traffic data for said non-intercepting traffic nodes.

7. A telecommunications network comprising:
a Data Retention Sources domain:
an Intercepting Control Elements domain, and
a Lawful Interception management system for retrieving at least one of user data and traffic data associated with a given target identity within said telecommunication network, the system comprising:
   a first common handover interface to both a Data Retention Sources domain and an Intercepting Control Elements domain, said first common handover interface being configured to receive at least one of user data and traffic data from both Data Retention Sources and Intercepting Control Elements;
   a second common handover interface to at least one Law Enforcement Agency;
   an Administrative Function device configured to send polling requests via said first common handover interface to said Data Retention Sources domain for retrieving at least one of updated user data or updated traffic data relating to and retained for said target identity;
   at least one Mediation/Delivery function device configured to compare said updated user data or traffic data received via the first common handover interface with previously received user data or traffic data, respectively, and to send said updated user data or traffic data as Intercept Related Information to said at least one Law Enforcement Agency via said second common handover interface if changes between said updated data and said previously received data meet predetermined requirements.

8. The network of claim 7, wherein said first common handover interface comprises a first handover interface and a second handover interface, wherein said Administrative Function device is connected to said first handover interface and is configured to send a request for at least one of updated user data or updated traffic data relating to and retained for said target identity to said Data Retention Sources domain via said first handover interface, and wherein said Mediation/Delivery Function device is connected to said second handover interface and is configured to receive said updated data in response to said request.

9. The network of claim 8, wherein said second common handover interface comprises a third handover interface and a fourth handover interface, wherein said Administrative Function device is connected to said third handover interface and is further configured to receive a lawful interception request from said at least one Law Enforcement Agency via said third handover interface, said lawful interception request comprising a start of interception time of said target identity, and wherein said Mediation/Delivery Function device is connected to said fourth handover interface and is configured to send said updated data as Intercept Related Information to said at least one Law Enforcement Agency via said fourth handover interface.

10. The network of claim 9, wherein said user/traffic retained data is historical user data or traffic data available at the Data Retention Sources in a configurable time span before said start of interception time.

11. The network of claim 7, wherein the lawful interception request comprises a command to stop interception if said predetermined requirements are not met.

12. The network of claim 7, wherein said Lawful Interception management system is configured to:
   retrieve a list of traffic nodes which are applicable to the target identity;
   determine differences between the topology of the Intercept Control Elements domain and the Data Retention Sources domain for finding out non-intercepting traffic nodes;
   send, via said first common handover interface, a request for traffic data associated with said target identity for said non-intercepting traffic nodes; and
   receive, via said first common handover interface, said traffic data for said non-intercepting traffic nodes.

13. A method implemented by a Lawful interception management system within a telecommunication network for retrieving at least one of user data and traffic data associated with a given target identity within the telecommunication network, of the method comprising:
   receiving from at least one Law Enforcement Agency a lawful interception request for at least one of user data and traffic data associated with a given target identity of the telecommunication network;
   retrieving said user data or traffic data from at least one of a Data Retention Sources domain and an Intercepting Control Elements domain, via a first common handover interface which is common to both of said domains;
   sending polling requests to said Data Retention Sources domain,
   retrieving at least one of updated user data and updated traffic data relating to and retained for said target identity,
   comparing the updated data with previously received data for said target identity; and
   sending said updated data as Intercept Related information to said at least one Law Enforcement Agency if changes between said updated data and said previously received data meet predetermined requirements.

14. The method of claim 13, wherein said lawful interception request comprises a start of interception time of said target identity.

15. The method of claim 14, wherein said user data or traffic data is historical user data or traffic data available at the Data Retention Sources in a configurable time span before said start of interception time.

16. The method of claim 13, further comprising stopping interception if said predetermined requirements are not met.

17. The method of claim 13, further comprising:
   retrieving a list of traffic nodes which are applicable to the target identity;
   determining differences between the topology of the Intercept Control Elements domain and the Data Retention Sources domain for finding out non-intercepting traffic nodes;
   sending, via said first common handover interface, a request for traffic data associated with said target identity for said non-intercepting traffic nodes; and
   receiving, via said first common handover interface, said traffic data for said non-intercepting traffic nodes.

* * * * *

UNITED STATES PATENT AND TRADEMARK OFFICE
CERTIFICATE OF CORRECTION

PATENT NO. : 8,606,190 B2  
APPLICATION NO. : 13/126027  
DATED : December 10, 2013  
INVENTOR(S) : Attanasio et al.

Page 1 of 1

It is certified that error appears in the above-identified patent and that said Letters Patent is hereby corrected as shown below:

In the Specification:

In Column 7, Line 17, delete "34h" and insert -- 34b --, therefor.

In Column 7, Line 54, delete "33h" and insert -- 33b --, therefor.

In the Claims:

In Column 12, Line 22, in Claim 13, delete "of the method" and insert -- the method --, therefor.

Signed and Sealed this
Fifteenth Day of July, 2014

Michelle K. Lee
*Deputy Director of the United States Patent and Trademark Office*